D. M. HARTSOUGH.
DRAG BAR CONNECTION FOR TRACTORS.
APPLICATION FILED JAN. 28, 1914.
1,138,611.
Patented May 4, 1915.
2 SHEETS—SHEET 1.
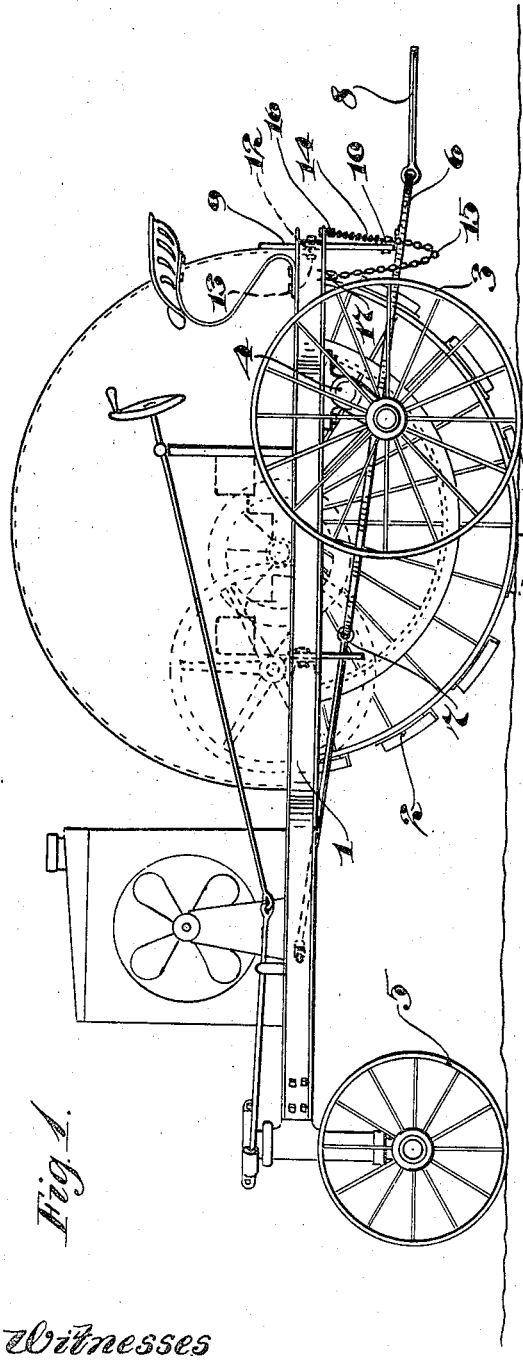
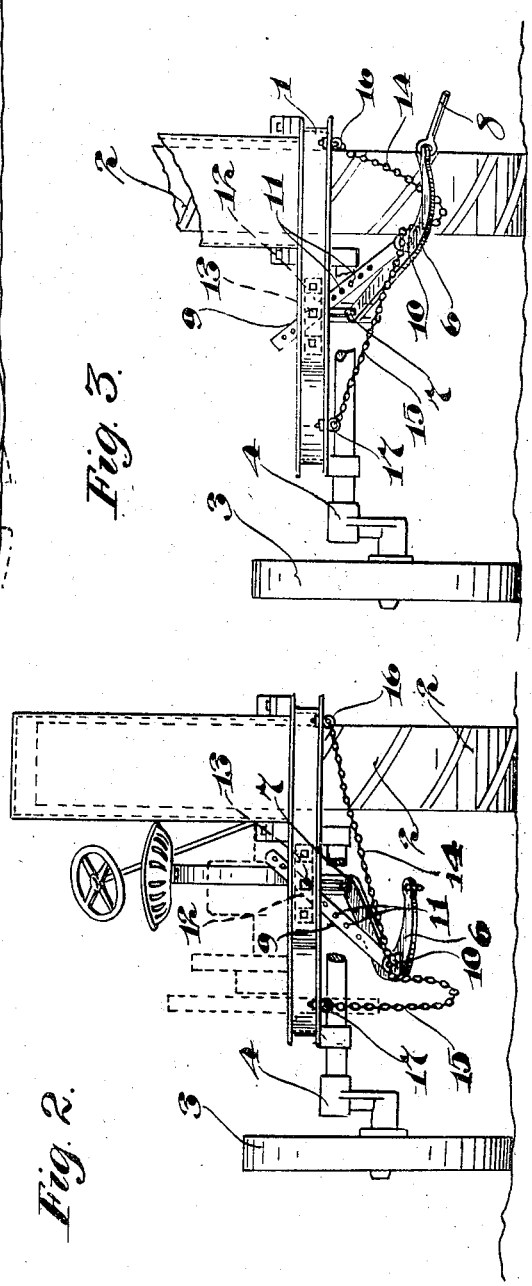
Witnesses
E. C. Skinkle
A. H. Opsahl
Inventor
D. Maurice Hartsough
By his Attorneys
Williamson Merchant

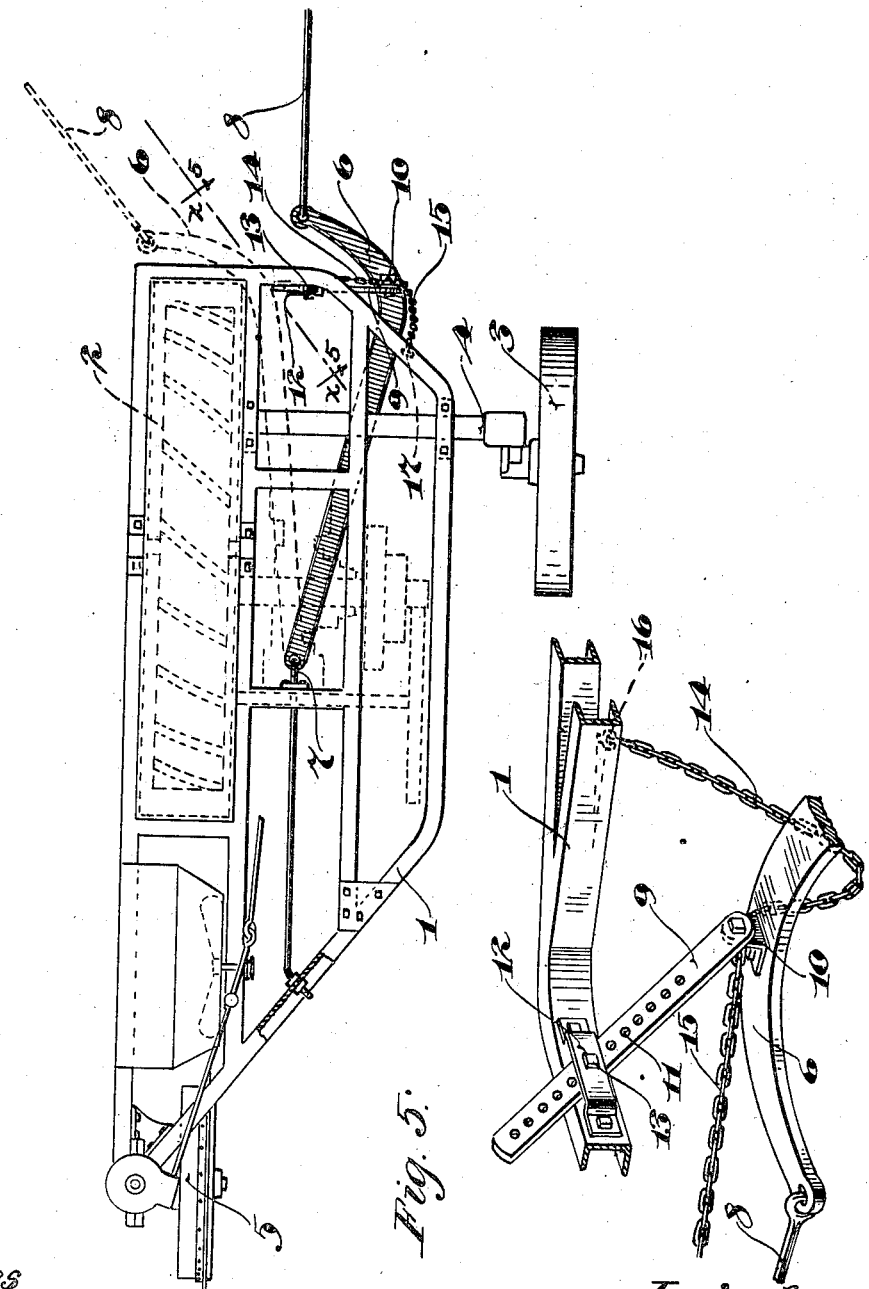

UNITED STATES PATENT OFFICE.

D. MAURICE HARTSOUGH, OF MINNEAPOLIS, MINNESOTA, ASSIGNOR TO BULL TRACTOR COMPANY, OF MINNEAPOLIS, MINNESOTA, A CORPORATION OF MINNESOTA.

DRAG-BAR CONNECTION FOR TRACTORS.

1,138,611.  Specification of Letters Patent.  Patented May 4, 1915.

Application filed January 28, 1914. Serial No. 814,971.

*To all whom it may concern:*

Be it known that I, D. MAURICE HARTSOUGH, a citizen of the United States, residing at Minneapolis, in the county of Hennepin and State of Minnesota, have invented certain new and useful Improvements in Drag-Bar Connection for Tractors; and I do hereby declare the following to be a full, clear, and exact description of the invention, such as will enable others skilled in the art to which it appertains to make and use the same.

My invention relates to tractors of the type disclosed and claimed in my co-pending application S. No. 792,275, filed of date, September 29th, 1913, and has for its object to provide an improved draw bar therefor.

The tractor above described has three wheels, to-wit, two rear wheels and one front wheel. Of the two rear wheels, one only is a traction wheel and this wheel carries by far the greater part of the weight of the tractor. The front wheel is located directly in front of the relatively large traction wheel and is adapted to run in the same furrow where it is utilized as a steering and guiding wheel. This front wheel and the offset rear wheel carry relatively small parts of the load, so that the center of gravity of the machine is brought very close to the single rear traction wheel. With this arrangement, the machine in turning either toward the right or toward the left, swings with a sort of oscillatory movement having the traction wheel as its pivot. When the tractor is used to drag plows, it is desirable that the line of draft strain be slightly inward of the traction wheel, so that the front wheel, which is used as a guide in the furrow, will be held snugly against the land side of the last furrow. This insures the desired steering action, or in other words, makes it certain that the guide wheel will hug the land side wall of the furrow, and thus accurately guide the tractor and plows. In practice, however, it has been found that with a tractor of this character, having the plow drag or draw bar fixedly attached or located on the tractor frame, there is great difficulty in causing the tractor to turn toward the right, at times when the tractor is used to draw other loads than plows and at which times the guide wheel runs of level ground. In the present invention, I obviate this difficulty by the employment of a drag bar pivotally attached to the tractor frame at its front end and provided with a curved or bent rear end that is arranged to clear the rear of the traction wheel and to swing back of the traction wheel or beyond the same, toward the furrow side of the machine, to-wit, toward the right in a tractor which has its traction wheel located on the right hand side.

The improved drag bar construction is illustrated in the accompanying drawings, wherein like characters indicate like parts throughout the several views.

Referring to the drawings: Figure 1 is a left side elevation showing the tractor with my improved drag bar connection applied thereto; Fig. 2 is a rear elevation of the parts shown in Fig. 1, showing the drag bar in normal position or swung toward the left; Fig. 3 is a view corresponding to Fig. 2, but with some parts broken away and with a drag bar swung toward the right; Fig. 4 is a plan view with some parts broken away and with some parts removed, showing the tractor and drag bar connections; and Fig. 5 is a fragmentary perspective showing parts of the tractor frame and of the drag bar connections.

Of the parts of the tractor, in so far as it is desirable for the purpose of this case, the numeral 1 indicates as an entirety the rigid horizontally disposed skeleton metallic framework of the tractor truck, the numeral 2 indicates the relatively large single traction wheel, the numeral 3 the offset relatively small rear wheel secured to the crank end of a crank axle 4 that is adjustably secured in suitable bearings on the framework 1, and the numeral 5 indicates a front wheel which is located directly in front of the traction wheel and serves as a guiding and steering wheel.

Of the parts of the draw bar connections, the numeral 6 indicates the draw bar proper, which, at its front end is pivotally connected to the intermediate portion of the truck frame 1, at a point slightly inward of the traction wheel. Preferably, and as shown, the front end of this draw bar is pivotally connected to an eye formed on the rear end of a heavy draw bolt 7, passed through one of the intermediate transverse bars of the framework 1 and anchored at its front end to the oblique front bar of the said frame. The rear end of the draw bar 6 is bent or curved toward the right, or more generally stated, toward the traction wheel side of the machine, and this laterally bent end portion is arranged to swing toward the right at the rear of the traction wheel. To the free offset rear end of the said draw bar 6, a draw bolt 8 is attached. This draw bolt 8 might be in the form of a cable or any other suitable connection adapted to pull plows or any vehicle or load which it is desirable to pull by means of the tractor. Preferably, I provide in connection with the said draw bar means for securing the same in different vertical adjustments with freedom for lateral swinging movement, and stop devices for limiting the lateral swinging movements thereof in both directions. The first noted means is preferably in the form of metallic strap or link 9 shown as pivotally connected at its lower end to a lock or bracket 10 on the said draw bar, and provided with longitudinally spaced perforations 11. The perforated portion of this link 9 works in a keeper bracket 12 on the rear bar of the frame 1, and a bolt 13 passed through the said rear bar and bracket and one of the said perforations 11, serves to pivotally support the link in the different adjustments required to support the free end of the draw bar in different vertical positions.

The numerals 14 and 15 indicate stop chains shown as attached to the lock 10 and the anchor bolts 16 and 17, respectively, on the right hand and left hand rear portions of the frame 1. The said chain 14 limits the movement of the draw bar toward the left and the chain 15 limits the movements of the draw bar toward the right.

In Fig. 4, the position which the crooked or offset draw bar 6 will take in pulling a load with the tractor running straight ahead, is indicated by full lines, and the extreme position which the said draw bar will take in drawing the load when the tractor is turning toward the right, or toward the traction wheel side of the tractor is indicated by dotted lines. In the said full line position of the draw bar, it will be noted that the line of draft strain is approximately parallel to, but inward of the inner face of the traction wheel, while in the drawing line position of the said draw bar, the line of strain extends obliquely through the traction wheel and very nearly intersects a vertical line passing through the ground engaging lower portion of the said traction wheel, or in other words, more nearly intersects the pivot on which the tractor swings in turning toward the right, or toward the traction wheel or furrow side of the tractor. Hence, it is evident that in turning toward the right, the tendency of the draft strain to slue or shift the guide wheel 5 toward the left, progressively decreases as the tractor is turned farther and farther toward the right. With this arrangement, it has been found that the turning of the tractor toward the right, or toward the furrow or traction wheel side of the machine is made an easy matter.

What I claim is:

1. The combination with a tractor having a single traction wheel, of a draw bar connected thereto and arranged to swing from a position at one side of said traction wheel into a position at the rear of said traction wheel and vice versa, a vertically adjustable connection supporting the rear end of said draw bar from said tractor with freedom for laterally swinging movements, and stop devices limiting the lateral swinging movements of said draw bar.

2. The combination with a tractor having a single rear traction wheel, a laterally offset rear wheel and a front guide wheel of a draw bar pivotally connected to the tractor frame adjacent to the inner side of said traction wheel, and having a free rear end offset toward said traction wheel and arranged to swing behind the same when the tractor is turned toward the traction wheel side thereof.

3. The combination with a tractor having a single rear traction wheel, a laterally offset rear wheel and a front guide wheel, of a draw bar pivotally connected to the tractor frame adjacent to the inner side of said traction wheel, and having a free rear end offset toward said traction wheel and arranged to swing behind the same when the tractor is turned toward the traction wheel side thereof, a vertically adjustable connection supporting the free rear end of said draw bar from the tractor frame, and a draw connection attached to the offset free end of said draw bar.

4. The combination with a tractor having a single rear traction wheel, a laterally offset rear wheel and a front guide wheel, of a draw bar pivotally connected to the tractor frame adjacent to the inner side of said traction wheel, and having a free rear end offset toward said traction wheel and arranged to swing behind the same when the tractor is turned toward the traction wheel side thereof, vertically adjustable connection supporting the free rear end of said draw bar from the tractor frame, and a draw connection attached to the offset free end of said draw bar, and stop chains attached to said draw bar and to said tractor frame for limiting the lateral swinging movements thereof.

In testimony whereof I affix my signature in presence of two witnesses.

D. MAURICE HARTSOUGH.

Witnesses:
 HARRY D. KILGORE,
 F. D. MERCHANT.

Copies of this patent may be obtained for five cents each, by addressing the "Commissioner of Patents, Washington, D. C."